United States Patent
Yun et al.

(10) Patent No.: US 12,218,320 B2
(45) Date of Patent: Feb. 4, 2025

(54) BATTERY MODULE AND MANUFACTURING METHOD THEREFOR

(71) Applicant: LG CHEM, LTD., Seoul (KR)

(72) Inventors: Ji Ho Yun, Goyang-Si (KR); Sang Jin Kim, Cheongju-Si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1569 days.

(21) Appl. No.: 16/487,295

(22) PCT Filed: Aug. 24, 2018

(86) PCT No.: PCT/KR2018/009785
§ 371 (c)(1),
(2) Date: Aug. 20, 2019

(87) PCT Pub. No.: WO2019/045368
PCT Pub. Date: Mar. 7, 2019

(65) Prior Publication Data
US 2019/0372082 A1    Dec. 5, 2019

(30) Foreign Application Priority Data
Aug. 29, 2017    (KR) .................. 10-2017-0109543

(51) Int. Cl.
*H01M 10/48*    (2006.01)
*H01M 50/20*    (2021.01)
(Continued)

(52) U.S. Cl.
CPC ......... *H01M 10/48* (2013.01); *H01M 10/482* (2013.01); *H01M 10/486* (2013.01);
(Continued)

(58) Field of Classification Search
CPC ............ H01M 50/213; H01M 50/502; H01M 50/559; H01M 10/482; H01M 10/486; H01M 10/48
See application file for complete search history.

(56) References Cited

U.S. PATENT DOCUMENTS 6,440,601 B1    8/2002    Aoi et al.
2012/0161677 A1    6/2012    Kunimitsu et al.
(Continued)

FOREIGN PATENT DOCUMENTS

CN    1757138 A    4/2006
CN    102222797 A    10/2011
(Continued)

OTHER PUBLICATIONS

International Search Report for PCT/KR2018/009785 (PCT/ISA/210) mailed on Dec. 4, 2018, with English translation.
(Continued)

*Primary Examiner* — Ula C Ruddock
*Assistant Examiner* — Frank A Chernow
(74) *Attorney, Agent, or Firm* — Birch, Stewart, Kolasch & Birch, LLP

(57) ABSTRACT

A battery module and a manufacturing method therefor are provided. The battery module includes a pair of cylindrical battery cells, a pair of PTC elements at one side of the pair of battery cells, a connection member at an opposite side of the pair of cylindrical battery cells from the one side of the pair of cylindrical battery cells, and a connector having four wires connected to a single connection terminal and configured to electrically connect an external system and the pair of cylindrical battery cells via the connection terminal is provided.

6 Claims, 3 Drawing Sheets

(51) Int. Cl.
*H01M 50/213* (2021.01)
*H01M 50/50* (2021.01)
*H01M 50/502* (2021.01)
*H01M 50/559* (2021.01)
*H01M 50/548* (2021.01)
*H01M 50/562* (2021.01)
*H01M 50/586* (2021.01)

(52) U.S. Cl.
CPC ....... *H01M 50/213* (2021.01); *H01M 50/502* (2021.01); *H01M 50/559* (2021.01); *H01M 50/548* (2021.01); *H01M 50/562* (2021.01); *H01M 50/586* (2021.01)

(56) References Cited

U.S. PATENT DOCUMENTS

| | | | |
|---|---|---|---|
| 2012/0251849 A1 | 10/2012 | Park et al. | |
| 2014/0193684 A1* | 7/2014 | Kwag | H01M 50/213 429/99 |
| 2016/0172642 A1* | 6/2016 | Hughes | H01M 50/227 429/130 |
| 2018/0159096 A1 | 6/2018 | Kim et al. | |
| 2018/0226628 A1 | 8/2018 | Takasu et al. | |

FOREIGN PATENT DOCUMENTS

| | | |
|---|---|---|
| CN | 204029915 U | 12/2014 |
| EP | 2 475 066 A1 | 7/2012 |
| EP | 2 544 263 A1 | 1/2013 |
| JP | 3863693 B2 | 12/2006 |
| JP | 2013-132142 A | 7/2013 |
| JP | 2017-069098 A | 4/2017 |
| KR | 10-2005-0086303 A | 8/2005 |
| KR | 10-2007-0037058 A | 4/2007 |
| KR | 10-2009-0061925 A | 6/2009 |
| KR | 10-0971368 B1 | 7/2010 |
| KR | 10-2012-0073195 A | 7/2012 |
| KR | 10-2016-0102725 A | 8/2016 |
| KR | 10-2017-0054878 A | 5/2017 |

OTHER PUBLICATIONS

European Search Report for Appl. No. 18851165.3 dated Mar. 18, 2020.

* cited by examiner

[Fig.1]
Conventional Art
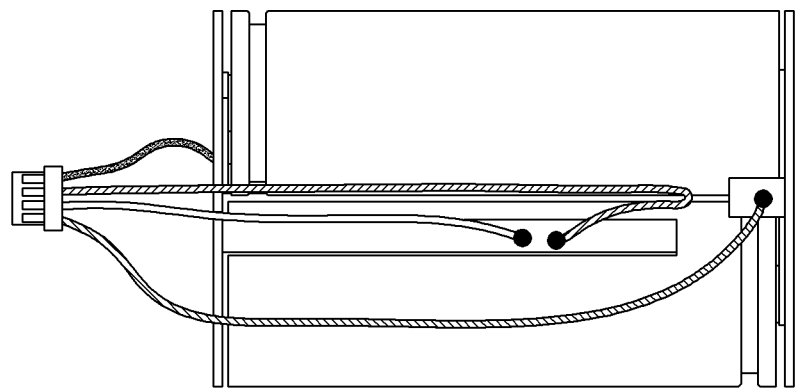
[Fig.2]
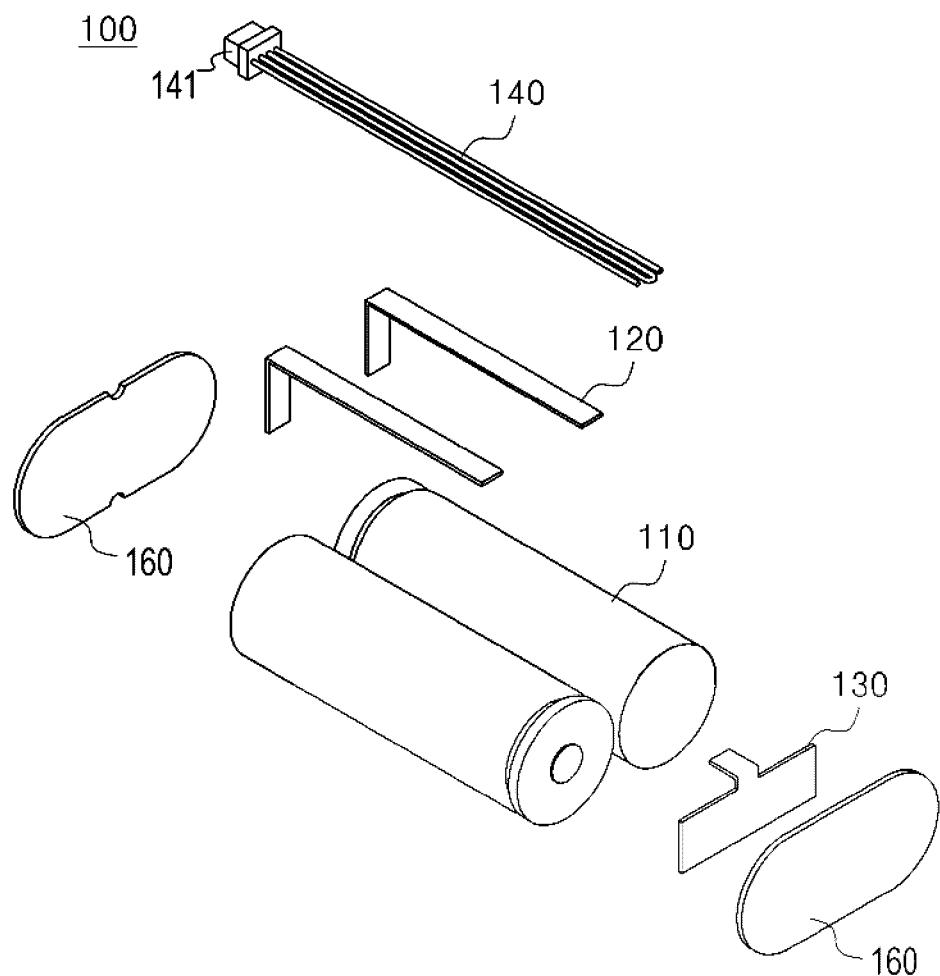

[Fig.3]
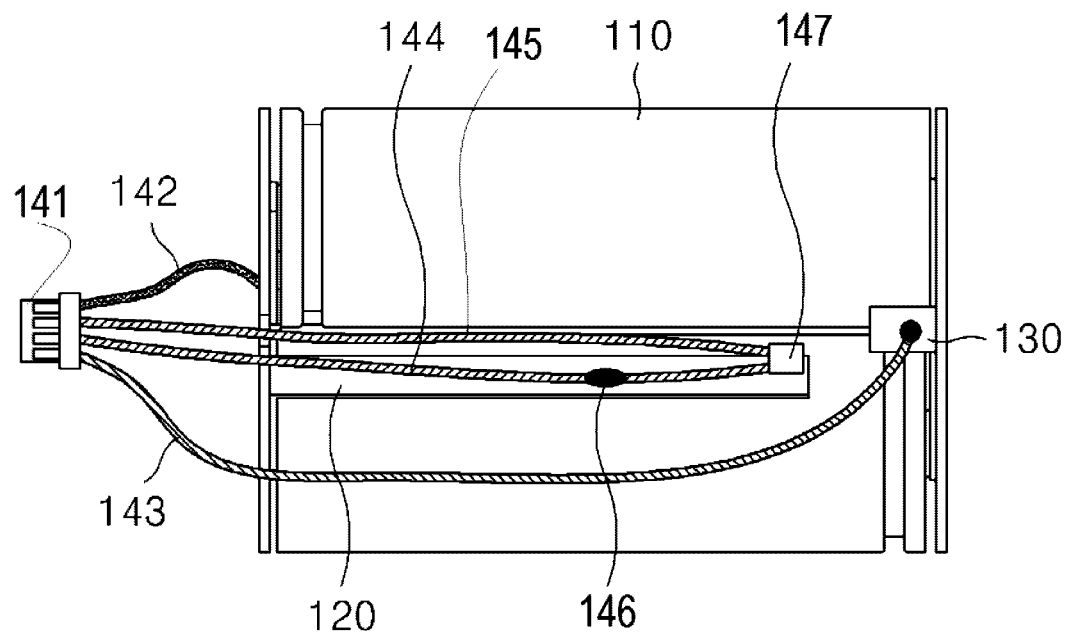
[Fig.4]
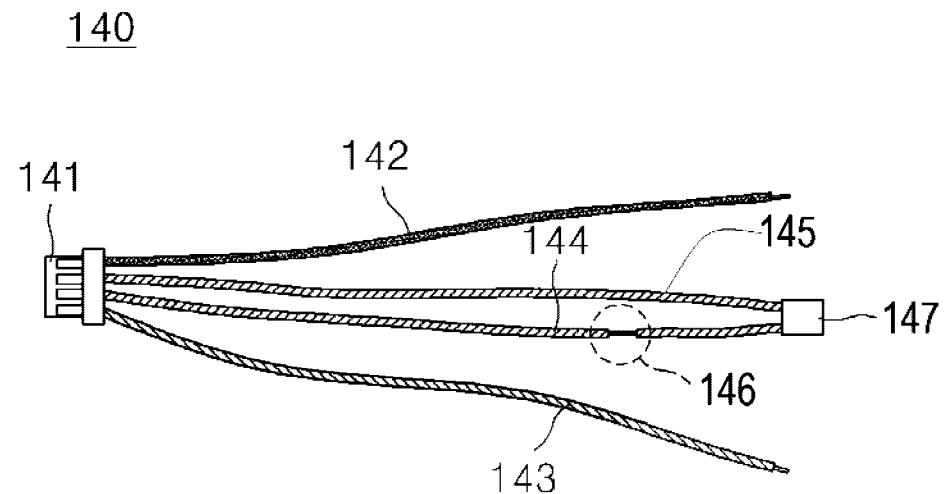

[Fig.5]
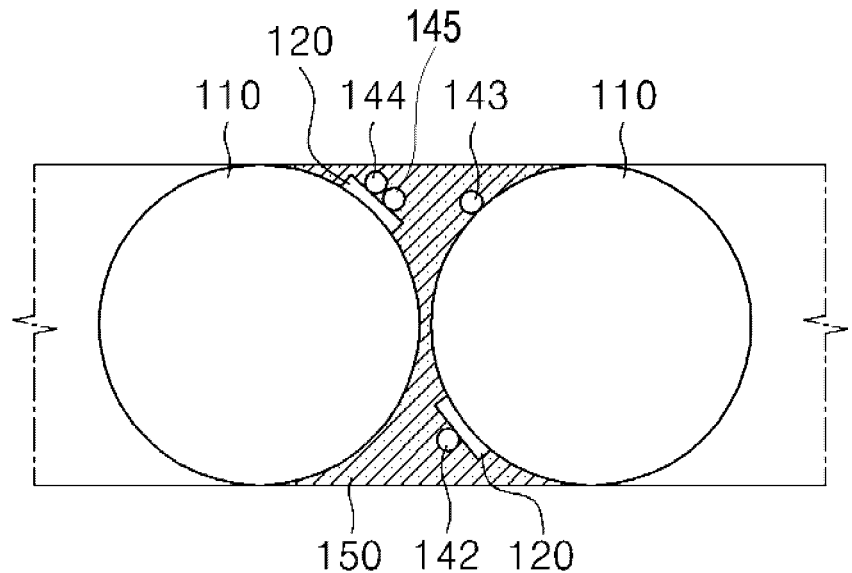
[Fig.6]
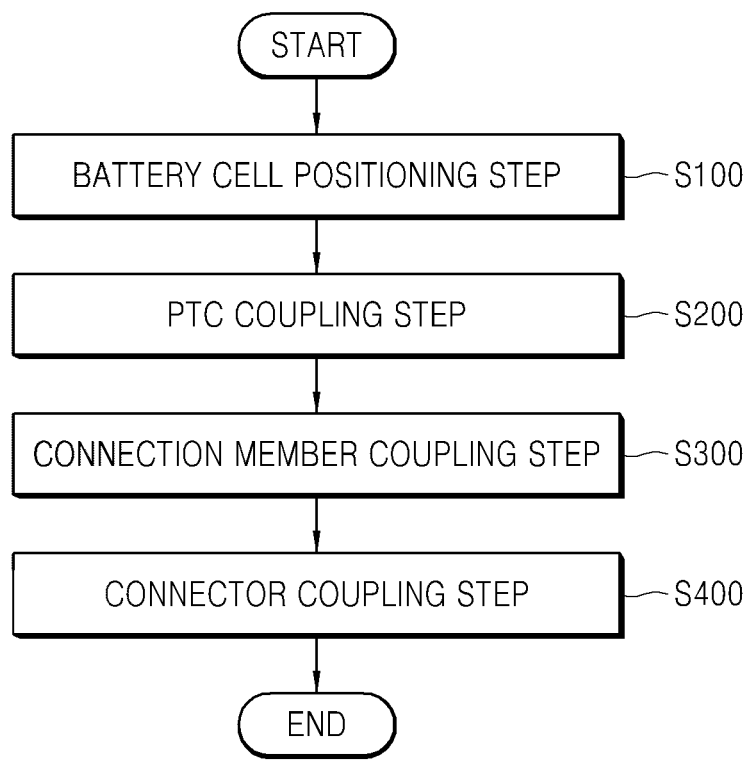

BATTERY MODULE AND MANUFACTURING METHOD THEREFOR

TECHNICAL FIELD

The present disclosure relates to a battery module and a manufacturing method therefor, and more particularly, to a batter module and a manufacturing method therefor, in which an electrode terminal and a connector are coupled through a small number of times of welding.

BACKGROUND ART

The lithium secondary battery, as a unit cell constituting a battery pack, has flexibility, a relatively free shape, a small weight, and excellent safety, and thus has increasing demand as a power source for mobile electronic apparatuses, such as smart phones, camcorders, and laptop computers.

In addition, the shape of the battery module is classified according to the shape of a battery case. When an electrode assembly is embedded in a cylindrical or rectangular metal can, the battery module is classified into a cylindrical battery module or rectangular battery module, and when the electrode assembly is embedded in a pouch-type case of an aluminum sheet, the battery module is classified into a pouch-type battery module.

In addition, the electrode assembly contained in the battery case is provided as a structure including a positive electrode, a negative electrode, and a separator inserted between the positive electrode and the negative electrode, and can thereby be charged/discharged, and the shape of the cylindrical electrode assembly is formed in a jelly-roll type in which a positive electrode, a separator, and a negative electrode which have long sheet-like shapes coated with an electrode active material are sequentially laminated and wound.

Meanwhile, the cylindrical electrode assembly is applied to an E-Call service device that transmits, when an accident occurs, accident information through a sensor embedded in a smart phone or a vehicle, and the cylindrical electrode assembly is formed in a battery module composed of two battery cells.

A conventional shape of such a battery module will be described with reference to FIG. 1.

FIG. 1 is an inner structural view of a conventional battery module.

Referring to FIG. 1, a conventional battery module has a structure in which two battery cells are coupled to an integrated connector provided with a thermistor and are connected to an external system. The integrated connector is provided in a form in which a first wire coupled to a positive (+) electrode terminal, a second wire coupled to a connection member connected between battery cells, and two wires, which are connected to a thermistor, are connected to a single connection terminal.

In order to measure the voltage of the battery cell, a wire should be connected to a negative (−) electrode terminal, and in order to be connected to the negative (−) electrode terminal, a single wire is further required. Thus, rather than adding a wire, a thermistor having a pair of leads one of which has a short length was used, and a wire shorter than a common length was provided to a connection terminal corresponding to the thermistor.

However, such a configuration requires four times of soldering, and the costs of the thermistor one lead of which has a short length is expensive, whereby a problem of increasing process time and process costs occurs.

Thus, a method for reducing the process time and costs required for the process is being demanded.

RELATED ART DOCUMENT

Patent Document (Patent Document 1) Korean Patent Laid-open Publication No. 10-2012-0073195

DISCLOSURE OF THE INVENTION

Technical Problem

The present invention provides a battery module, which can be speedily produced and is formed in a structure in which the costs for production are reduced, and a manufacturing method therefor.

Technical Solution

In accordance with an exemplary embodiment, a battery module includes a pair of cylindrical battery cells, each battery cell including a positive electrode terminal and a negative electrode terminal which face different directions, and the battery cells being arranged to be in close contact with or adjacent to each other; a pair of PTC elements provided at one side of the pair of battery cells, a first PTC element of the pair of PTC elements being provided to the positive electrode terminal at one side of the pair of cylindrical battery cells and a second PTC element of the pair of PTC elements being provided to the negative electrode terminal at the one side of the pair of cylindrical battery cells; a connection member configured to electrically connect the positive electrode terminal and the negative electrode terminal which are at an opposite side of the pair of cylindrical battery cells from the one side of the pair of cylindrical battery cells; a connector having a structure in which four wires are connected to a single connection terminal and is configured to electrically connect an external system and the pair of cylindrical battery cells via the connection terminal, the connector having a thermistor; and a coupling valley provided in a region in which the pair of cylindrical battery cells are arranged to be in close contact with or adjacent to each other, wherein the pair of PTC elements and the four wires are provided in the coupling valley.

The four wires of the connector may include: a first wire connected to the first PTC element; a second wire connected to the connection member; and third and fourth wires which are connected to the second PTC element through a bonding part formed on a portion of the third wire.

The third and fourth wires may form a single structure via the thermistor.

The bonding part of the third wire may be formed by removing a predetermined range of a coating of the third wire.

The first and second PTC elements may each be bent from an upper portion of a corresponding one of the battery cells and extend along a side surface of the corresponding one of the battery cells.

The battery module may further include an insulating member on at least one of the PTC elements and an insulating member on the connection member.

In accordance with another exemplary embodiment, a method for manufacturing a battery module, in which a connector including a thermistor is connected to a pair of battery cells, each battery cell having a positive electrode terminal and a negative electrode terminal which face different directions, includes: a battery cell positioning step for positioning the pair of battery cells on a jig configured to fix left and right side surfaces of the pair of battery cells; a PTC coupling step for coupling respective PTC elements of a pair of PTC elements to a positive electrode terminal and a negative electrode terminal which are positioned on one side of the pair of battery cells positioned on the jig; a connection member coupling step for coupling a connection member to the positive electrode terminal and the negative electrode terminal which are located on an opposite side of the pair of battery cells from the one side of the pair of battery cells to which the pair of PTC elements have been coupled; and a connector coupling step for coupling the connector to the pair of battery cells to which the connection member has been coupled.

The connector coupling step may include: a positive electrode terminal connecting step for connecting a first wire among four wires of the connector to the positive electrode terminal provided on the one side of the pair of battery cells; a connection member connecting step for connecting a second wire among the four wires of the connector to the connection member; and a negative electrode terminal connecting step for connecting third and fourth wires among the four wires of the connector to the negative electrode terminal provided on the one side of the pair of battery cells.

Prior to the connector coupling step, a predetermined range of a coating on the third wire may be removed After the connector coupling step, an insulating member may be attached or coated on the pair of PTC elements and an insulating member may be attached or coated on the connection member.

Advantageous Effects

In accordance with a battery module and a method for manufacturing the same, a smaller number of times of welding is performed than that in related arts through a bonding part provided on one lead among a pair of leads of a thermistor, whereby the battery module can be speedily produced and production costs are reduced.

In addition, components disposed inside the battery cell are located in a coupling valley provided by the coupling of cylindrical battery cells, whereby a predetermined thickness of the module can be obtained.

BRIEF DESCRIPTION OF THE DRAWINGS

FIG. 1 is an inner structural view of a conventional battery module.

FIG. 2 is an exploded perspective view of a battery module in accordance with an exemplary embodiment.

FIG. 3 is a view of an inner coupled structure of a battery module in accordance with an exemplary embodiment.

FIG. 4 is a structural view of a connector including a thermistor in accordance with an exemplary embodiment.

FIG. 5 is a side view of a battery module in accordance with an exemplary embodiment.

FIG. 6 is a flowchart of a method for manufacturing a battery module in accordance with an exemplary embodiment.

MODE FOR CARRYING OUT THE INVENTION

Hereinafter, embodiments of the present invention will be described in detail with reference to the accompanying drawings. However, the present invention is not restricted or limited by the exemplary embodiments. Rather, these embodiments are provided so that this disclosure will be thorough and complete, and will fully convey the scope of the inventive concept to those skilled in the art.

Although the terms such as "first" and "second" are used herein to describe various elements, these elements should not be limited by these terms. These terms are only used to distinguish one element from other elements. For example, a first element could be termed a second element, and similarly, a second element could be termed a first element, without departing from the scope of the present invention. In the following description, the terms are used only for explaining a specific exemplary embodiment while not limiting the present invention. The singular forms are intended to include the plural forms as well, unless the context clearly indicates otherwise.

The terms used in the present invention are selected from the general terms that are widely used at present if possible and in consideration of the functions in the present invention, but the terms may be changed depending on the intent of a person skilled in the art or the precedents, or by the emergence of new technologies, etc. Further, certain terms may be arbitrarily chosen, in which case the corresponding meaning will be described in detail in the present invention. Accordingly, the terms used in the present invention should be defined not simply on the basis of the names of the terms, but on the basis of the meanings of the terms and the context throughout the description.

Embodiment 1

Hereinafter a battery module in accordance with an exemplary embodiment will be described.

A battery module in accordance with an exemplary embodiment is more speedily produced and allows production costs to be reduced in such a way that a connector including a thermistor having a bonding part is connected to a pair of cylindrical battery cells.

FIG. 2 is an exploded perspective view of a battery module in accordance with an exemplary embodiment.

FIG. 3 is a view of an inner coupled structure of a battery module in accordance with an exemplary embodiment.

Referring to FIGS. 2 and 3, a battery module 100 in accordance with an exemplary embodiment has a configuration in which a connector including a thermistor is connected to a pair of battery cells. The battery module 100 is configured to include: a pair of battery cells 110 each having a positive (+) electrode terminal and a negative (−) electrode terminal which face directions different from each other and arranged to be in close contact with or adjacent to each other; a pair of PTC elements 120 respectively provided on the positive (+) electrode terminal and the negative (−) electrode terminal which are on the same side of the pair of battery cells; a connection member 130 which electrically connect the positive (+) electrode terminal and the negative (−) electrode terminal which are on the other side of the pair of cylindrical battery cells; a connector 140 having a structure in which four wires are connected to a single connection terminal 141 and configured to electrically connect an external system and the pair of battery cells through the connection terminal; and a coupling valley 150 (as shown in FIG. 5) provided in a region in which the pair of cylindrical battery cells are coupled to be in close into close contact with or adjacent to each other.

In addition, the PTC elements 120 and the four wires of the connector are provided in the coupling valley 150.

The configurations of the battery module 100 will be described below in more detail.

The battery cells 110 are a pair of components in each of which the positive (+) electrode terminal and the negative (−) electrode terminal face directions different from each other and which are arranged to be in close contact with or adjacent to each other, are formed in cylindrical battery cells, and have the directions of the electrode terminals made different so that the pair of battery cells may easily be connected in series.

In addition, the PTC elements 120 are components respectively provided to the positive (+) electrode terminals and the negative (−) electrode terminals which are on one side of the pair of battery cells, and are formed in shapes of being bent from an upper portion of the battery cells and extending to the side surfaces of the battery cells.

In addition, side surface parts extending on the side surfaces of the PTC elements 120 are formed in a shape to be in close contact with the battery cells, and are located in a remaining space in a circular shape, and thus do not change the thickness and height of the battery module.

In addition, since an insulating member 160 should be additionally attached on upper portions of the PTC elements 120, wires of the connector 140 may easily be connected to electrode terminals, respectively.

In addition, when an overcurrent flows, the PTC elements 120 disconnect a current path to protect the battery module from an abnormal state.

In addition, the PTC elements 120 may cause a short when located in the same side surface, and thus are provided to be located on surfaces opposed to each other.

For example, when one PTC element is located on the front surface, the other PTC element is located on the rear surface so that portions connected to each other do not touch each other.

In addition, the connection member 130 is a component which electrically connects the positive (+) electrode terminal and the negative (−) electrode terminal which are on the other side of the pair of battery cells, and in general, formed of a metal plate with excellent electrical conductivity.

In addition, the connection member 130 is further provided with a protrusion part for facilitating bonding with the wires, and is further provided with the insulating member 160 outside the connection member to make it possible to form an insulating state and to allow the pair of battery cells 120 to be firmly fixed.

In addition, the connector 140 has a structure in which four wires are connected to a single connection terminal 141, and is a component which electrically connects an external system and the pair of battery cells. The connector will be described in detail with reference to FIG. 4.

FIG. 4 is a structural view of a connector including a thermistor in accordance with an exemplary embodiment.

Referring to FIG. 4, the connector 140 is configured to include: a first wire 142 connected to the PTC element 120 provided to the positive (+) electrode terminal; a second wire 143 connected to the connection member; and third and fourth wires 144 and 145 which are formed as two wires and connected to the PTC element provided to the negative (−) electrode terminal through a bonding part 146 formed on a portion of one wire 144 among the two wires 144, 145.

More specifically, the connection terminal 141 is a component in which one side of the four wires is fixed to form a single connector, and the side opposed to the side on which wires are fixed is formed in a shape of a terminal which can be electrically connected to an external system.

In addition, the first wire 142 is a component connected to the positive (+) electrode terminal of a single battery cell provided on one side of the battery module, and the second wire 143 is a component connected to a path of the current flowing between the positive (+) electrode terminals and the negative (−) electrode terminals of the pair of battery cells provided on the other side of the battery module. The first and second wires have different colors so as to be distinguished from each other and have different lengths according to respective coupling positions.

More strictly describing, the first wire 142 is bonded to an upper surface of the side surface part of the PTC element 120 which is provided to one side of the battery module and serves as the positive (+) electrode terminal, and the second wire 143 is bonded to the protrusion part of the connection member 120 which is provided on the other side of the battery module and connects the positive (+) electrode terminal and the negative (−) electrode terminal.

In addition, one side of the third and fourth wires 144 and 145 is connected to the connection terminal 141 and the other side is connected to each other via a thermistor 147 for measuring the temperature of the battery cells, and the thermistor 147 includes leads having the same length.

This configuration is for providing an integrated type connector including the thermistor 147. In related arts, a thermistor having leads with different lengths are used, a short lead is connected to a negative electrode terminal of a battery cell to serve as a thermistor, and a wire at a position corresponding to the short lead extends from a connection terminal and is connected to the negative electrode terminal of the battery cell, whereby electrical connection of a battery module is achieved.

However, in the related arts, although the short lead and the wire corresponding to the position of the short lead are connected to the negative electrode terminal of the same battery cell, there is difficulty in that welding is performed separately.

To solve the above problem, in the exemplary embodiment, a bonding part 146 is provided on a portion of the third wire 144 to allow the bonding part to be connected at once to the negative electrode terminal of the battery cell.

The bonding part 146 is a component provided by removing a predetermined range in the coating of the wire 143, and accordingly, an additional wire is not required on the position corresponding to the short lead in the related arts, whereby the number of times of welding and operators and production costs may be reduced.

In addition, the thermistor having a short lead in the related arts are more expensive than a thermistor having the same lead length, the material costs may also be reduced.

In addition, the third and fourth wires 144 and 145 are provided on one side of the battery module, and allows the bonding part 146 to be bonded on upper surfaces of the side surface parts of the PTC elements 120 which serve as the negative (−) electrode terminals. Accordingly, connection to the thermistor and the negative (−) electrode terminal may be performed at once.

In addition, and insulating member 160 is further attached or coated to a portion at which the wire comes into contact with the pair of battery cells and may thereby prevent a short occurring from the inside.

In addition, the PTC elements 120 and the wires of the connector 140 are attached to the pair of battery cells inside the coupling valley 150, and the structure of the coupling valley 150 will be described in more detail with reference to FIG. 5.

FIG. 5 is a side view of a battery module in accordance with an exemplary embodiment.

Referring to FIG. 5, the side surface parts of the PTC elements 120 are positioned to be misaligned with each other, and when the side surface part of the PTC element 120 of positive (+) electrode terminal of one battery cell is located at a lower right portion, the side surface part of the PTC element 120 is allowed to be positioned in the coupling valley 150. In addition, the first wire 142 is also allowed to be located on the upper surface of the side surface part of the PTC 120 located in the coupling valley 150.

In addition, the side surface part of the PTC element 120 of the negative (−) electrode terminal of the other battery cell is located in an upper left portion of the coupling valley 150, and the third and fourth wires 144 and 145 are located on the upper surface of the side surface part.

Also, the second wire 143 connected to the connection member 130 is also located in an upper right portion of the coupling valley 150, thereby allowing a predetermined thickness of the battery module to be obtained.

Embodiment 2

Next, a method for manufacturing a battery module in accordance with an exemplary embodiment will be described.

A method for manufacturing a battery module in accordance with the exemplary embodiment can produce a battery module more speedily than the four times of boding in the related arts because a connector provided with four wires is connected, by means of three times of bonding, to a battery module in which a PTC and a connection member are coupled.

FIG. 6 is a flowchart of a method for manufacturing a battery module in accordance with an exemplary embodiment.

Referring to FIG. 6, in a method for manufacturing a battery module in accordance with the exemplary embodiment, firstly, battery cells 110 are positioned on a jig for fixing the left and right side surfaces of the pair of battery cells (battery cell positioning step: S100), and then PTC elements 120 are respectively coupled to positive and negative electrode terminals located on one side of the pair of battery cells positioned on the jig (PTC coupling step: S200).

A connection member 130 is coupled to the positive and negative electrode terminals located on the other side of the pair of battery cells to which the PTC elements 120 have been coupled (connection member coupling step: S300), and a connector 140 is coupled to the battery module to which the connection member has been coupled (connector coupling step: S400).

Each of the steps of the method for manufacturing the battery module will be described below in more detail.

The battery cell positioning step S100 is a step for positioning the battery cells 110 on a jig for fixing the left and right side surfaces of the pair of battery cells, wherein the separate jig for fixing the pair of battery cells is provided to allow the battery module to be stably manufactured.

In addition, the PTC coupling step S200 is a step for respectively coupling the PTC elements 120 on to the positive and negative electrode terminals located on one side of the pair of battery cells 110 positioned on the jig, wherein the PTC elements are located so that the side surface parts of the PTC elements face different directions, are then bonded to the upper portions of the positive electrode terminal and the negative electrode terminal, respectively. In addition, at this point, the side surface parts of the PTC elements are also bonded to portions of the side surfaces of the battery cells.

In addition, the connection member coupling step S300 is a step for coupling the connection member 130 to the positive and negative electrode terminals located on the other side of the pair of battery cells to which the PTC elements have been coupled, wherein the positive and negative electrode terminals are allowed to be electrically connected through the single connection member.

In addition, the connector coupling step S400 is a step for coupling the connector 140 to the battery module to which the connection member 130 has been coupled, and more specifically, a first wire 142 among four wires of the connector is connected to the positive (+) electrode terminal of one battery cell provided on one side of the battery module (positive (+) electrode terminal connecting step).

In addition, a second wire 143 among the four wires of the connector 140 is connected to the connection member to which the pair of battery cells provided on the other side of the battery module are electrically connected (connection member connection step), and third and fourth wires 144 and 145 among the four wires of the connector are connected to the negative (−) electrode terminal of the other battery cell provided on one side of the battery module (negative (−) electrode terminal connecting step).

More specifically, the positive (+) electrode terminal connection step is a step for bonding the first wire 142 to the PTC element 120 connected to the positive (+) electrode terminal of the battery cell, and the first wire is welded to the side surface part of the PTC element.

In addition, the connection member connecting step is a step for bonding the second wire 143 to the connection member, wherein the second wire is welded to the protrusion part of the connection member.

In addition, the negative (−) electrode terminal connecting step is a step for coupling the third and fourth wires 144 and 145 to the PTC element 120 connected to the negative (−) electrode terminal of the battery cell, and prior to the step, a step for removing a predetermined range of coating of one wire 143 among the third and fourth wires 143 and 144 is performed.

Then, the wire 143 in which the predetermined range of coating has been removed is welded to the side surface part of the PTC element 120.

After the connector coupling step S400 is completed, an insulating member 160 is attached or coated on the pair of PTC elements 120 and the upper portion of connection member to prevent occurrence of a short from the outside, and an insulating member 160 is also attached or coated on a portion at which the wires of the connector and the battery cells come into contact to prevent a short from the inside.

Meanwhile, the technical idea of the present invention has been specifically described with respect to the above embodiments, but it should be noted that the foregoing embodiments are provided only for illustration while not limiting the present disclosure. In addition, a person with an ordinary skill in the technical field belonging to the present invention may carry out various embodiments within the scope of claims set forth herein.

DESCRIPTION OF SYMBOLS

100: Battery Module
110: One Pair of Battery Cells
120: One Pair of PTC Elements
130: Connection Member 140: Connector
141: Connection Terminal
142: First Wire
143: Second Wire
144: Third Wire
145: Fourth Wire
147: Thermistor
146: Bonding Part
150: Coupling Valley
160: Insulating Member

What is claimed is:

1. A battery module, comprising:
a pair of cylindrical battery cells, each battery cell comprising a positive electrode terminal and a negative electrode terminal which face different directions, and the battery cells being arranged to be in close contact with or adjacent to each other;
a pair of PTC elements provided at one end of the pair of battery cells, a first PTC element of the pair of PTC elements being provided to the positive electrode terminal at the one end of the pair of cylindrical battery cells and a second PTC element of the pair of PTC elements being provided to the negative electrode terminal at the one end of the pair of cylindrical battery cells;
a connection member configured to electrically connect the positive electrode terminal and the negative electrode terminal which are at an opposite end of the pair of cylindrical battery cells from the one end of the pair of cylindrical battery cells;
a connector having a structure in which four wires are connected to a single connection terminal and is configured to electrically connect an external system and the pair of cylindrical battery cells via the connection terminal, the connector including a thermistor; and
a coupling valley provided in a region in which the pair of cylindrical battery cells are arranged to be in close contact with or adjacent to each other,
wherein the pair of PTC elements and the four wires extend in the coupling valley.

2. The battery module of claim 1, wherein the four wires of the connector include:
a first wire connected to the first PTC element;
a second wire connected to the connection member; and
third and fourth wires which are connected to the second PTC element through a bonding part formed on a portion of the third wire.

3. The battery module of claim 2, wherein the third and fourth wires form a single structure via the thermistor.

4. The battery module of claim 2, wherein the bonding part of the third wire is formed by removing a predetermined range of a coating of the third wire.

5. The battery module of claim 1, wherein each of the first and second PTC elements is bent from an upper portion of a corresponding one of the battery cells and extends along a side surface of the corresponding one of the battery cells.

6. The battery module of claim 1, further comprising an insulating member on at least one of the first and second PTC elements and an insulating member on the connection member.

* * * * *